(12) United States Patent
Yang et al.

(10) Patent No.: US 7,991,230 B2
(45) Date of Patent: Aug. 2, 2011

(54) MODELING MICRO-STRUCTURE FOR FEATURE EXTRACTION

(75) Inventors: Qiong Yang, Beijing (CN); Dian Gong, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 11/466,332

(22) Filed: Aug. 22, 2006

(65) Prior Publication Data
US 2007/0086649 A1 Apr. 19, 2007

Related U.S. Application Data

(60) Provisional application No. 60/726,707, filed on Oct. 14, 2005.

(51) Int. Cl.
G06K 9/00 (2006.01)
(52) U.S. Cl. ............ 382/181; 382/118; 382/159
(58) Field of Classification Search .......... 385/195, 385/100, 101, 103, 214, 181, 118
See application file for complete search history.

(56) References Cited

U.S. PATENT DOCUMENTS

| 5,710,830 A * | 1/1998 | Holeva ............... 382/173 |
| 6,774,917 B1 | 8/2004 | Foote et al. |
| 2003/0122942 A1 * | 7/2003 | Parker et al. ........ 348/231.3 |

FOREIGN PATENT DOCUMENTS

JP 2005078149 3/2005

OTHER PUBLICATIONS

He et a:1 "Multiscale Conditional Random Fields for Image Labeling", 2004 IEEE Computer Society Conference on Computer Vision and Pattern Recognition (CVPR'04).*
Dansereau, et al., "Lip Feature extraction using motion, color, and edge information", IEEE, 2003, pp. 1-6.
PCT Search Report dated Mar. 8, 2007 relating to Application No. PCT/US2006/040536.

* cited by examiner

*Primary Examiner* — Samir Ahmed
*Assistant Examiner* — Ruiping Li
(74) *Attorney, Agent, or Firm* — Lee & Hayes, PLLC

(57) ABSTRACT

Exemplary systems and methods use micro-structure modeling of an image for extracting image features. The micro-structure in an image is modeled as a Markov Random Field, and the model parameters are learned from training images. Micro-patterns adaptively designed from the modeled micro-structure capture spatial contexts of the image. In one implementation, a series of micro-patterns based on the modeled micro-structure can be automatically designed for each block of the image, providing improved feature extraction and recognition because of adaptability to various images, various pixel attributes, and various sites within an image.

13 Claims, 7 Drawing Sheets

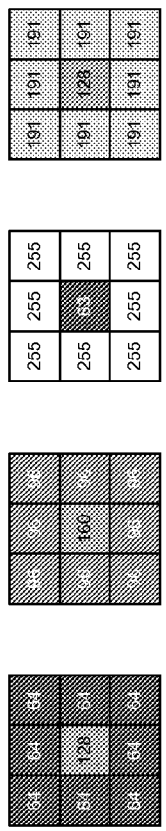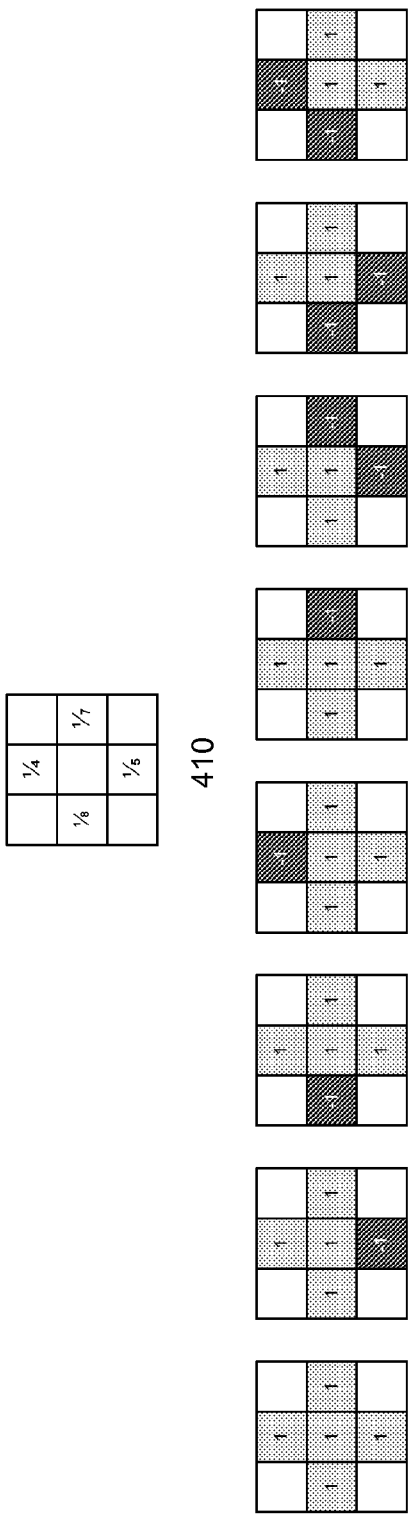
Fig. 4

MODELING MICRO-STRUCTURE FOR FEATURE EXTRACTION

RELATED APPLICATIONS

This application claims priority to U.S. Provisional Patent Application No. 60/726,707 to Yang et al., entitled "Modeling Micro-Structure For Feature Extraction," filed on Oct. 14, 2005, and incorporated herein by reference.

BACKGROUND

Feature extraction is one of the most important issues in many vision tasks, such as object detection and recognition, face detection and recognition, glasses detection, and character recognition. Conventional micro-patterns, such as edge, line, spot, blob, corner, and more complex patterns, are designed to describe the spatial context of the image via local relationships between pixels and can be used as filters or templates for finding and extracting features in an image. In other words, a micro-pattern is a filter or template for recognizing a visual feature portrayed by pixel attributes.

However, these conventional micro-patterns are intuitively user-designed based on experience, and are also limited by being application-specific. Thus, conventional micro-patterns fit for one task might be unfit for another. For example, the "Four Directional Line Element" is successful in character recognition, but does not achieve the same success in face recognition, since facial images are much more complex than a character image and cannot be simply represented with a directional lines. Another problem is that in some cases, it is difficult for the user to intuitively determine whether the micro-pattern is appropriate without trial-and-error experimenting. A similar problem exists for Gabor features. Gabor features have been used to recognize general objects and faces, but the parameters are mainly adjusted by experimental results, which costs a great deal of time and effort to find appropriate micro-patterns and parameters. What is needed for better feature extraction and recognition is a system to automatically generate micro-patterns with strong linkages to one or more mathematical properties of the actual image.

SUMMARY

Exemplary systems and methods use micro-structure modeling of an image for extracting image features. The micro-structure in an image is modeled as a Markov Random Field, and the model parameters are learned from training images. Micro-patterns adaptively designed from the modeled micro-structure capture spatial contexts of the image. In one implementation, a series of micro-patterns based on the modeled micro-structure can be automatically designed for each block of the image, providing improved feature extraction and recognition because of adaptability to various images, various pixel attributes, and various sites within an image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a diagram of exemplary micro-patterns.

DETAILED DESCRIPTION

Overview

Figure 1:
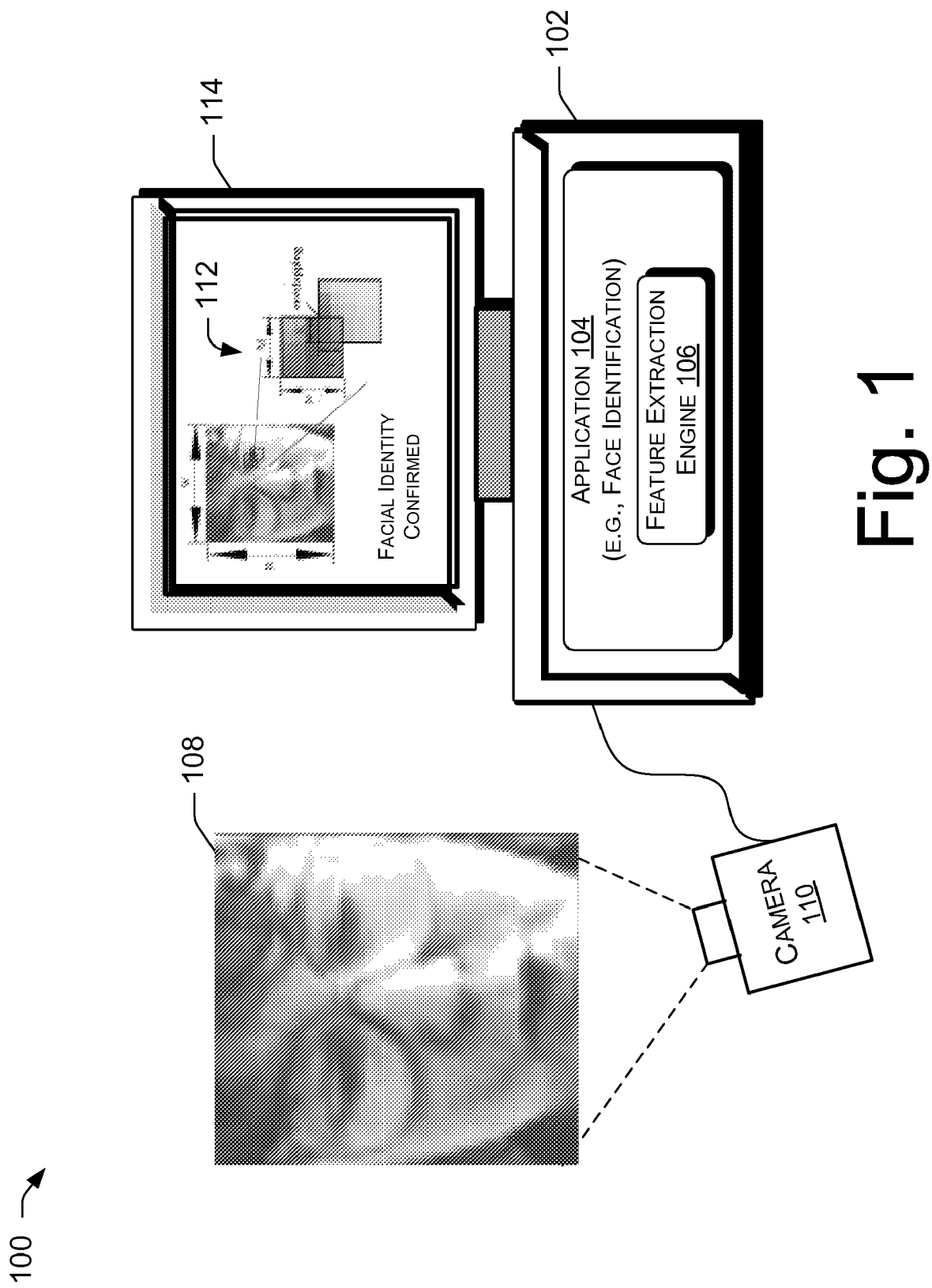
FIG. 1 is a diagram of an exemplary Markov Random Field (MRF)-based feature extraction system.

This disclosure describes systems and methods for model-based extraction of features from an image. These exemplary systems and methods introduce the concept of automatic modeling of features—i.e., structure-based features—during the process of feature extraction. This modeling-based feature extraction can be generally applied to many types of applications. Such applications include, for example, face identification and glasses recognition.

In contrast, conventional feature extraction techniques rely on finding predetermined features fashioned intuitively by experience, and each conventional technique is usually very specific to one type of application. These conventional feature patterns, contrived by experience or derived by trial-and-error, are often painstaking, and they lace the adaptability to various applications.

The exemplary micro-patterns described herein, however, are built from spatial-dependencies that are modeled from mathematics and learned from examples. The resulting exemplary micro-patterns are more generally applicable to many applications that require feature extraction.

In one implementation, an exemplary system divides a pre-aligned image into small blocks and assumes a homogenous model in each block. A series of micro-patterns that best fits with the block are then designed for each block. The occurrence probability of micro-patterns is computed site by site in each block to form a sequence whose Modified Fast Fourier Transform (MFFT) features are extracted to reflect the regional characteristics of its corresponding micro-patterns. Then, all the MFFT features from all blocks of the image are concatenated together to efficiently represent the image.

An exemplary image feature thus modeled, has the following traits. First, the exemplary image feature is a micro-structural feature. Compared with the holistic features from such as PCA (principal component analysis), the exemplary image feature can model the local spatial dependence and can be used to design adaptive micro-patterns, while conventional holistic features extract global characteristics of the image. Therefore, the exemplary image features are more capable of capturing spatial context, which plays an important role in many vision tasks, such as face recognition and character recognition.

The exemplary image feature modeled by micro-structure is used to design adaptive micro-patterns. Compared with conventional feature extraction methods based on micro-patterns, the adaptive micro-patterns are designed from the extracted feature using the MRF model, rather than intuitively user-defined. The type of micro-pattern to automatically design is learned from training samples, so that the resulting micro-pattern is adaptive to different images, different attributes, and different sites of an image.

The exemplary image features are also model-based. Compared with conventional learning-based features from learning-based filters such as Local Feature Analysis and Independent Component Analysis, the exemplary image features can model local spatial context directly, and thereby give rise to finer and more delicate micro-patterns than conventionally extracted features can.

Exemplary Environment

FIG. 1 shows an exemplary computing environment, a feature extraction system 100, in which exemplary feature modeling and extraction can be practiced. In one implementation, a computing device 102 hosts an application 104 in which feature extraction is used, such as face identification or glasses detection. An exemplary feature extraction engine 106 performs the exemplary micro-structure-based feature extraction to be described more fully below. In the illustrated example of a feature extraction system 100, a facial image 108 is captured by a digital camera 110. The image 108 is passed to the application 104 for face identification, via the exemplary feature extraction engine 106.

In one implementation, the feature extraction engine 106 divides the image 108 into small overlapping visual blocks 112. Although an example block 112 is shown on the display 114, the blocks 112 are typically not displayed by an application 104, but are used only for mathematical processing. A selected attribute of the pixels of each block—that is, the image micro-structure—is modeled as a Markov Random Field (MRF). Markov Random Fields are well-suited for modeling spatial dependencies in an image. From the MRF model, adaptive micro-patterns are defined. The parameters of the MRF model for each block are obtained through learning from a set of aligned images. Thus, a collection of generic image features is modeled in order to design adaptive micro-patterns.

The feature extraction engine 106 also defines a fitness function, by which a fitness index is computed to encode the image's local fitness to the adaptive micro-patterns. Theoretical analysis and experimental results show that such an exemplary feature extraction system 100 is both flexible and effective in extracting features.

Because the exemplary micro-patterns are adaptively designed according to the spatial context of images, the micro-patterns are adaptive to various images, various attributes, and various sites of an image. This enables the adaptive micro-patterns to be used by the feature extraction engine 106 in many different applications, such as face detection, face identification, glasses detection, character recognition, object detection, object recognition, etc.

Exemplary Feature Extraction Engine

Figure 2:
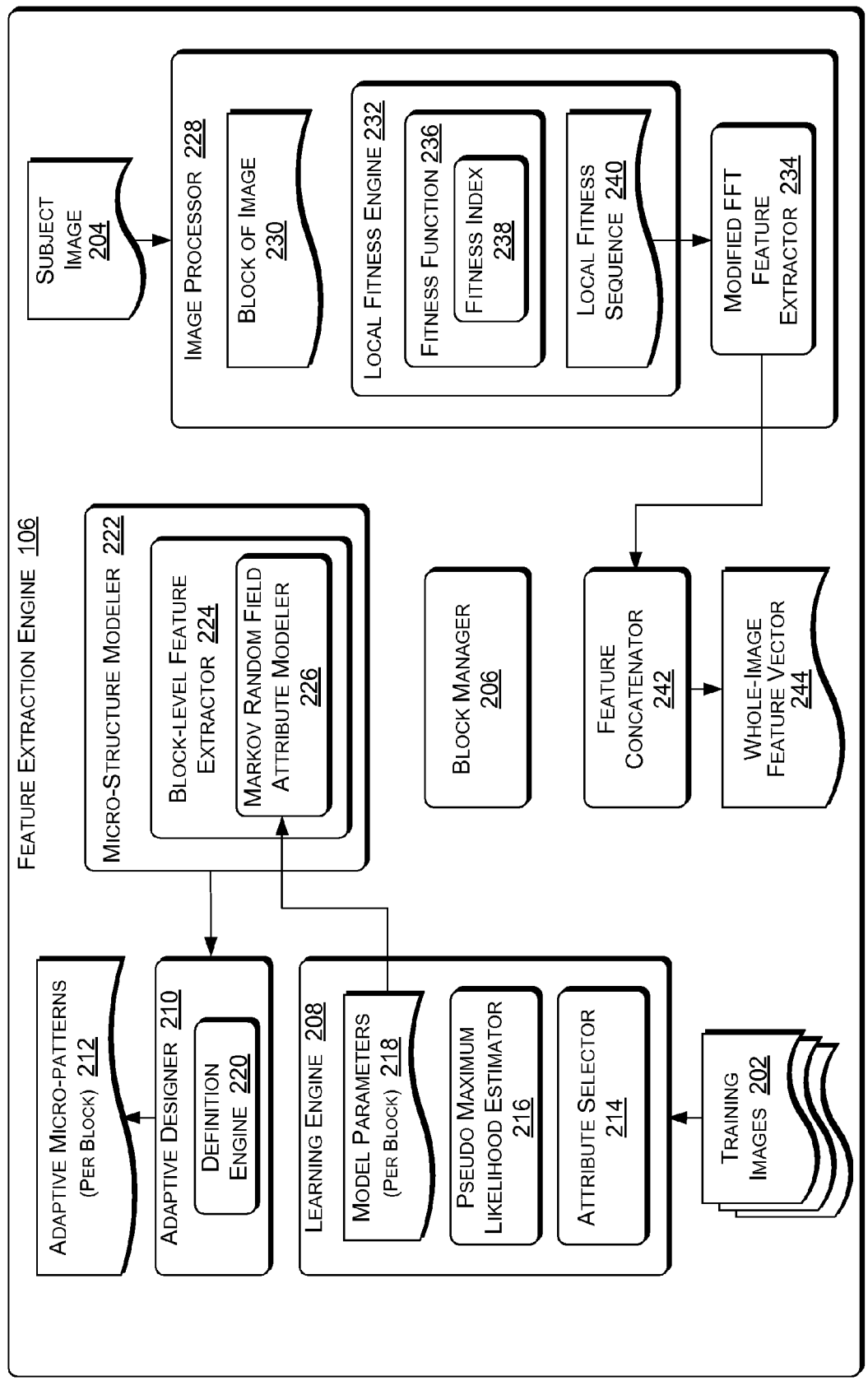
FIG. 2 is a block diagram of an exemplary feature extraction engine.

FIG. 2 shows the exemplary feature extraction engine 106 of FIG. 1 in greater detail. The illustrated configuration of the feature extraction engine 106 is only one implementation, and is meant to provide only one example arrangement for the sake of overview. Many other arrangements of the illustrated components, or similar components, are possible within the scope of the subject matter. The illustrated lines and arrows are provided to suggest flow and emphasize connection between some components. Even if no coupling line is illustrated between two components, the illustrated components are generally in communication with each other as needed because they are components of the same feature extraction engine 106. Such an exemplary feature extraction engine 106 can be executed in hardware, software, combinations of hardware, software, firmware, etc.

In one implementation, the feature extraction engine 106 includes components to learn model parameters from training images 202 for the Markov Random Field micro-structure modeling, and to design adaptive micro-patterns relevant for a particular image. The feature extraction engine 106 also includes components for processing a subject image 204, i.e., for extracting features from the subject image 204. A block manager 206 controls the size, overlap, and registration of blocks in an image, for both the training images 202 and the subject image 204.

For the above-mentioned training, the feature extraction engine 106 includes a learning engine 208, an adaptive designer 210, and a buffer or storage for resulting micro-patterns 212. The learning engine 208 just introduced further includes an attribute selector 214, a pseudo maximum likelihood estimator 216, and a buffer for model parameters 218, i.e., for each block. The adaptive designer 210 may further include a definition engine 220.

The learning engine 208 and the other components just introduced are communicatively coupled with a micro-structure modeler 222 that includes a block-level feature extractor 224 and a Markov Random Field (MRF) attribute modeler 226. In one implementation, processing the subject image also uses the same micro-structure modeler 222.

To process images, an image processor 228 includes a buffer for one image block 230, a local fitness engine 232, and a MFFT feature extractor 234. The local fitness engine 232 may further include a fitness function 236 suitable for producing a fitness index 238. The image processor 228 further includes buffer space for a local fitness sequence 240.

For a global result of the entire subject image 204, the feature extraction engine 106 also includes a feature concatenator 242 to combine features of all blocks of an image into a single vector: a micro-structural feature 244 representing the entire image.

Exemplary Components of the Feature Extraction Engine

An overview of the exemplary engine 106 is now provided. The block manager 206 divides the image 204 into blocks 112 by which the MRF attribute modeler 226 extracts block-level micro-structural features for each block 112. Later, the local fitness engine 232, based on the MRF modeling, computes a local fitness sequence 240 to describe the image's local fitness to micro-patterns.

The MFFT extractor 234 derives a transformed feature from the local fitness sequence 240 of each block 112. The feature concatenator 242 combines these features from all the blocks into a long feature vector. This new feature is based on the image's microstructure and presents a description of the image on three levels: the Markov field model reflects the spatial correlation of neighboring pixels on a pixel-level; the local fitness sequence 240 in each block reflects the image's regional fitness to micro-patterns on a block level; and the features from all blocks are concatenated to build a global description of the image 204. In this way, both the local textures and the global shape of the image are simultaneously encoded.

Markov Random Field (MRF) Attribute Modeler

The exemplary feature extraction engine 106 implements a model-based feature extraction approach, which uses a Markov Random Field (MRF) attribute modeler 226 to model the micro-structure of the image 204 and design adaptive micro-patterns 212 for feature extraction.

The micro-structure modeler 222, in applying image structure modeling to feature extraction, provides at least three benefits. First, the modeling can provide a sound theoretical foundation for automatically designing suitable micro-patterns based on image micro-structure. Next, through modeling, the feature extraction engine 106 or corresponding methods can be more generally applied across a wider variety of diverse applications. Third, the modeling alleviates experimental trial-and-error efforts to adjust parameters.

The MRF attribute modeler 226 provides a flexible mechanism for modeling spatial dependence relations among pixels. In a local region of the image 204, the MRF attribute modeler 226 makes use of spatial dependence to model micro-patterns, with different spatial dependencies corresponding to different micro-patterns. Thus, the MRF attribute modeler 226 conveniently represents unobserved and/or complex patterns within images, especially the location of discontinuities between regions that are homogeneous in tone, texture, or depth.

Moreover, in one implementation, the parameters of the MRF model are statistically learned from samples instead of intuitively user-designed. Thereby MRF modeling is more adaptive to the local characteristics of images. Different micro-patterns can be designed for different kinds of images, different attributes of images, and even at different sites of a single image, so that the features extracted are more flexible, and more applicable to diverse applications.

From the description above, the MRF model is adaptive and flexible to the intrinsic pattern of images at different sites of the image. The parameters vary in relation to the site within a block. In addition, the model is adaptive to changing attributes of the image.

Figure 3:
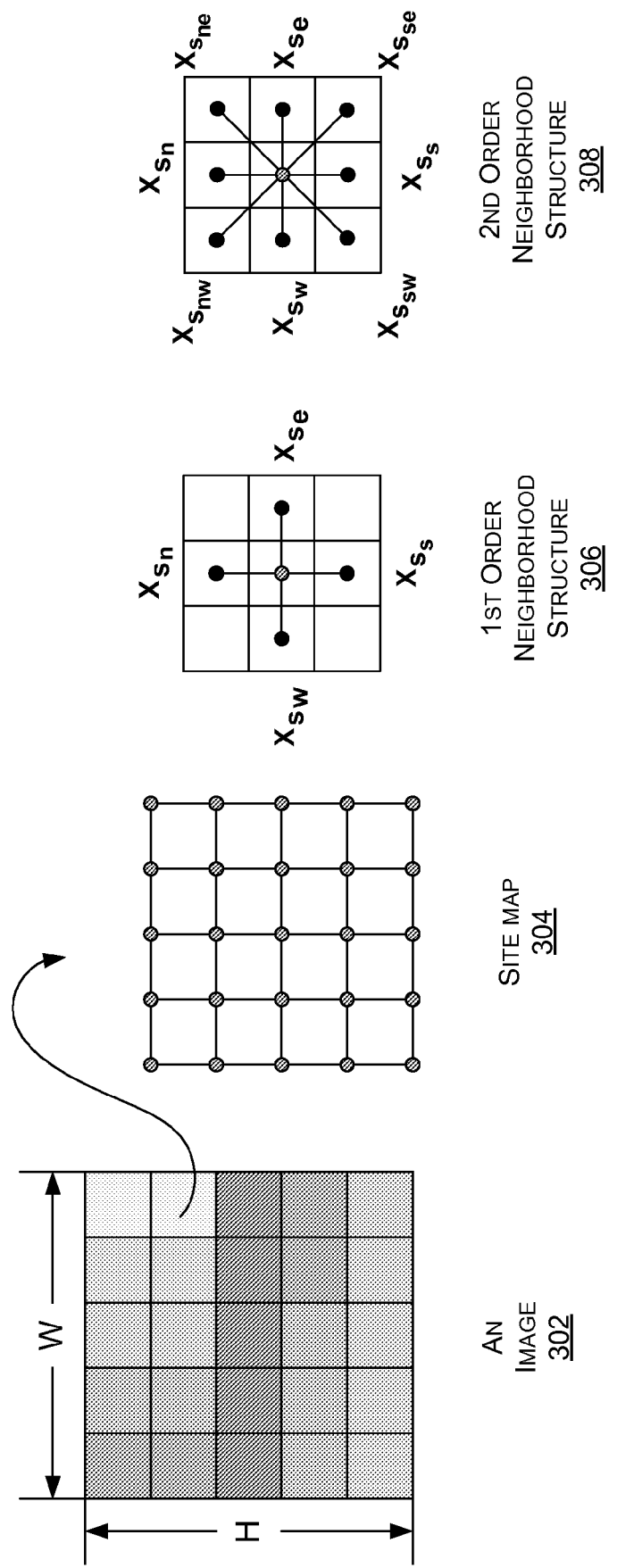
FIG. 3 is a diagram of exemplary neighborhood structure among pixel attributes.

FIG. 3 shows the 1st and 2nd order neighborhood structure of an image 302 of size H×W. S is the site map 304 of the image 302. The image 302 has a 1st order neighborhood structure 306 and a 2nd order neighborhood structure 308. To further understand the functioning of the MRF attribute modeler 226, let I represent an H×W image with S as its collection of all sites, and let $X_s = x_s$ represent some attribute of the image I at site s∈S. For example, the attribute selector 214 may select grayscale intensity, Gabor attribute, or another attribute. The attributes of all other sites in S excluding site s is denoted by $X_{-s} = x_{-s}$. The spatial distribution of attributes of S, i.e., $X = x = \{x_s, s \in S\}$, will be modeled as a Markov Random Field (MRF).

Let $N_s$ denote the neighbors of site s, and the r-th order neighborhood is defined to be $N_s^{(r)} = \{t | dist(s,t) \leq r, t \in s\}$, where dist(s, t) is the distance between site s and site t. The Markov model is similar or equivalent to the Gibbs random field model, so an energy function is used to calculate probability, as in Equation (1):

$$p(X_s | X_{-s}) = p(X_s | X_{n_1}) = \frac{1}{\tau} \exp\{-E_{\theta_s}(X_s, X_{N_s})\}, \quad (1)$$

where $E_{\theta_s}(X_s, X_{N_s})$ is the energy function at site s which is the sum of energies/potentials of the cliques containing site s, and $$\tau = \sum_{X_s} \exp\{-E_{\theta_s}(X_s, X_{N_s})\}$$

is the partition function. Here, $\theta_s$ is the parameter set for site s, so we rewrite $p(X_s | X_{N_s})$ as $p_{\theta_s}(X_s | X_{N_s})$.

For a pair-wise MRF model, there is $$E_{\theta_s}(X_s, X_{N_s}) = H_s(X_s) + \sum_{t \in N_s} J_{st}(X_s, X_t), \text{ where } H_s(X_s)$$

is the "field" at site s, and $J_{st}(X_s, X_t)$ is the "interaction" between site s and site t. Furthermore, if $$H_s(X_s) = 0 \text{ and } J_{st}(X_s, X_t) = \frac{1}{(\sigma_{st})^2}(X_s - X_t)^2,$$

then the "smooth model" is at play and there is $$E_{\theta_s}(X_s, X_{N_s}) = \sum_{t \in N_s} \frac{1}{(\sigma_{st})^2}(X_s - X_t)^2, \theta_s = \{\sigma_{st}, t \in N_s\}.$$

If $H_s(X_s) = \alpha_s X_s$, $J_{st}(X_s, X_t) = \beta_{st} X_s X_t$ and $X_s \in \{+1, -1\}$, s∈S, then the Ising model is at play and there is $$E_{\theta_s}(X_s, X_{N_s}) = \alpha_s X_s + \sum_{t \in N_s} \beta_{st} X_s X_t, \theta_s = \{\alpha_s, \beta_{st}, t \in N_s\}.$$

For simplicity, $\theta_s$ is taken as $\theta$.

Exemplary Adaptive Micro-Pattern Designer

FIG. 4 shows example micro-patterns. Such adaptive micro-patterns are used as "filters" to find or extract features from an image 204 and/or to identify the image. The feature extraction engine 106 aims to find the appropriate microstructure and its appropriate parameters for given image 204 by modeling micro-patterns 212.

Micro-patterns 402, 404, 406, and 408 are micro-patterns of the "smooth model." The sixteen micro-patterns 412, 414, 416, 418, 420, 422, 424, 426, 428, 430, 432, 434, 436, 438, 440, and 442 are micro-patterns of the Ising model, when the parameters of the Ising model are as shown in 410. In other words, the Ising model can discriminate all 16 of the patterns 412-442. Among them, there are "blob" micro-patterns 412 and 414; triangle micro-patterns 414, 416, 418, 420; corner micro-patterns 422, 424, 426, and 428; line micro-patterns 430 and 432; arrow micro-patterns 434, 436, 438, 440; and a ring micro-pattern 442. The Ising model has a strong ability to describe micro-patterns. The smooth model and the Ising model are selectable as forms for the modeling to be performed.

In one implementation, once the model form is selected (e.g., smooth, Ising, or others), micro-patterns 212 are determined (i.e., defined by Equation (2) below) by model parameters 218 produced by the learning engine 208. The model parameters 218 are used by the micro-structure modeler 222 to implement the MRF attribute modeler 226. The adaptive designer 210 includes a definition engine 220 that implements generalized definitions (Equation (2)) to create the adaptive micro-patterns 212.

Thus, at the adaptive designer 210, assume that Ω denotes the micro-pattern, and $\Omega_\theta(\gamma)$ is defined to be all the pairs of $(x_s, x_{N_s})$ that satisfy the constraint $g_\theta(x_s, x_{N_s}) = \gamma$ with given $\theta$, i.e., $\{(x_s, x_{N_s}) : g_\theta(x_s, x_{N_s}) = \gamma\}$. Here, $\theta$ is the parameter set.

$\Omega_\theta(\gamma)$ has the following properties.

1. Given $\theta, \{\Omega_\theta(\gamma), \gamma \in R$ describes a series of micro-patterns where R (set of Real Numbers) is the value set of $\gamma$.

2. When $\gamma$ is discrete, $\Omega_\theta(\gamma)$ is characterized by its probability $P(\Omega = \Omega_\theta(\gamma))$; when $\gamma$ is a continuous variable, $\Omega_\theta(\gamma)$ is characterized by the probability density function $p(\Omega_{74}(\gamma))$.

Since the feature extraction engine 106 uses the MRF model in the attribute modeler 226, it is defined that $g_\theta(x_s, x_{N_s}) = E_\theta(X_s = x_s, X_{N_s} = x_{N_s})$, therefore, as in Equation (2):

$$\Omega_\theta(\gamma) = \{(x_s, x_{N_s}) : E_\theta(X_s = x_s, X_{N_s} = x_{N_s}) = \gamma\} \quad (2)$$

That is, $(x_s, x_{N_s})$ in the same energy level belong to the same micro-pattern.

a) If the smooth model is at play, i.e., $$E_{\theta_s}(X_s, X_{N_s}) = \sum_{t \in N_s} \frac{1}{(\sigma_{st})^2}(X_s - X_t)^2, \quad (3)$$

$$\text{then } \Omega_\theta(\gamma) = \left\{ (x_s, x_{N_s}) : \sum_{t \in N_s} \frac{1}{(\sigma_{st})^2}(x_s - x_t)^2 = \gamma \right\}$$

As shown in FIG. 4, in this sense, micro-patterns 402 and 404 are deemed to be the same, while micro-patterns 406 and 408 are deemed to be different.

b) If the Ising model is used, i.e., $$H_\theta(X_s \mid X_{N_s}) = \alpha_s X_s + \sum_{t \in N_s} \beta_{st} X_s X_t$$

(with 1st order neighborhood), where $X_s \in \{+1, -1\}$, $\forall s \in S$ and $\theta = \{\alpha_s, \beta_{st}, t \in N_s\}$ as is shown in FIG. 4(e), there is $$\Omega_\theta(\gamma) = \left\{ (x_s, x_{N_s}) : \alpha_s x_s + \sum_{t \in N_s} \beta_{st} x_s x_t = \gamma \right\}. \quad (4)$$

As mentioned, the micro-patterns defined in Equation (2) are determined by the model parameters 218 once the model form is selected. The more parameters the model has, the more micro-patterns 212 it can discriminate. A micro-pattern designed by the definition engine 220 is adaptive to the local characteristics of the image 204, since the parameters 218 are statistically learned from the training samples 202. This is quite different from intuitively user-designed micro-patterns (e.g., of Gabor).

Exemplary Fitness Engine

The image processor 228 includes a local fitness engine 232 that finds features in the image 204 using the micro-patterns 212. The local fitness engine 232 includes a fitness function 236 that detects which micro-pattern 212 the local characteristics of the image at site s in one block 230 fit with.

Given $\theta$, for any given pair of $(X_s, X_{N_s})$ the fitness function $h_\theta(X_s, X_{N_s})$ is defined as in Equation (5):

$$h_\theta(X_s, X_{N_s}) = e^{-\gamma} \big|_{\gamma = g_\theta(X_s, X_{N_s})}. \quad (5)$$

Specifically, when $g_\theta(X_s, X_{N_s}) = E_\theta(X_s, X_{N_s})$, there is, as in Equation (6):

$$h_\theta(X_s, X_{N_s}) = e^{-\gamma} \big|_{\gamma = E_\theta(X_s, X_{N_s})}. \quad (6)$$

Then, the fitness index 238 can be computed as in Equation (7):

$$y_{\theta,s} = h_\theta(x_s, x_{N_s}) = e^{-\gamma} \big|_{\gamma = E_\theta(x_s, x_{N_s})}. \quad (7)$$

The fitness function 236 matches the local characteristics of the image 204 at site s with a particular micro-pattern 212. Furthermore, it enlarges the difference between small $\gamma$, where there is low potential or energy, and reduces the difference between large $\gamma$, where there is high potential or energy.

From the definition of micro-pattern in Equation (2) and the Markov Random Field model exemplified by Equation (1), —Equation (8) is next derived:

$$P(\Omega = \Omega_\theta(\gamma)) = \sum_{X_{N_s}} \{P(X_s : E_\theta(X_s, X_{N_s}) \quad (8)$$

$$= \gamma \mid X_{N_s} = x_{N_s}) P(X_{N_s} = x_{N_s})\}$$

$$= \sum_{X_{N_s}} \left\{ \left( \sum_{X_s E_\theta(X_s, X_{N_s}) = \gamma} \frac{1}{\tau} e^{-\gamma} \right) \cdot P(X_{N_s} = x_{N_s}) \right\}$$

$$= \sum_{X_{N_s}} \left\{ \frac{1}{\tau} \cdot V \cdot e^{-\gamma} \cdot P(X_{N_s} = x_{N_s}) \right\}$$

$$= Z \cdot e^{-\gamma} \text{ where } \tau = \sum_{x_s} \exp\{-E_\theta(X_s, X_{N_s})\}$$

is independent of $X_s$, V is the number of pairs $(x_s, x_{N_s})$, which belong to the micro-pattern $\Omega_\theta(\gamma)$ given $X_{N_s} = x_{N_s}$, and $$z = \sum_{X_{N_s}} \left\{ \frac{1}{\tau} \cdot V \cdot P(X_{N_s} = x_{N_s}) \right\}.$$

Note that both V and $\tau$ are only dependent on $X_{N_s}, X$ and $\theta$, so z is a constant that is only dependent on $\theta$. Consequently, as shown in Equation (9):

$$y_{\theta,s} = h_\theta(x_s, x_{N_s}) \propto P(\Omega = \Omega_\theta(\gamma) \big|_{\gamma = E_\theta(X_s = x_s, X_{N_s} = x_{N_s})}). \quad (9)$$

That is, the fitness index $y_{\theta,s}$ 238 is proportional to the probability of $$\Omega_\theta(\gamma) \big|_{\gamma = E_\theta(X_s = x_s, X_{N_s} = x_{N_s})}.$$

From the perspective of filter design, e.g., when the local fitness engine 232 determines the local fitness sequence 240, the fitness function 236 modulates the fitness to the micro-pattern 212 with its probability. The fitness function 236 enhances micro-patterns with low energies that have high probabilities, and depresses those with high energies that have low probabilities. Actually, for a given $\theta$, the adaptive designer 210 designs a series of micro-patterns $\Omega_\theta(\gamma)$, $\gamma \in R$, and $y_{\theta,s}$, the fitness index 238, indicates the occurrence probability of the micro-pattern $$\Omega_\theta(\gamma) \big|_{\gamma = E_\theta(X_s = x_s, X_{N_s} = x_{N_s})}$$

212, at site s.

The fitness sequence 240 can be computed as in Equation (10):

$$y = \{y_{\theta,s}, s = 1, 2, \ldots, n\}, \quad (10)$$

where n = H×W is the number of sites s in S.

Exemplary Learning Engine

The learning engine 208 estimates the parameters, $\Theta=\{\theta_s, s \in S\}$ 218, to be used by the MRF attribute modeler 226. The parameters 218 are estimated by learning from the training sample images 202. The training images 202 can be a library from a standard face database: e.g., the BANCA dataset, which contains 52 subjects with 120 images for each subject. Among them, five images/subjects in "Session 1" of BANCA are used for training images 202 (e.g., 260 images). In one implementation, the training images 202 are two training libraries, the first library is the grayscale intensity of the 260 faces, which are cropped and normalized to the size of 55×51 pixels based on automatic registration of eyes. The second library is the Gabor attributes of the same cropped faces, using a bank of Gabor filters with two scales and four orientations.

Suppose there are m independent samples $\{x_j, j=1, 2, \ldots, m\}$, where $x_j=[x_{j1}, x_{j2}, \ldots, x_{jn}]^T$. The maximum likelihood estimation (MLE) can be treated like the optimization in Equation (11):

$$\Theta^* = \operatorname{argmax} \prod_{j=1}^{m} p_\Theta(X_1 = x_{j1}, X_2 = x_{j2,\ldots}, X_n = x_{jn}). \tag{11}$$

However, since there is $p(X_s=x_s|X_{-s}=x_{-s})=p(X_s=x_s|X_{N_s}=x_{N_s})$, the estimator 216 uses a pseudo maximum likelihood estimation (PMLE) for the approximation in Equation (12):

$$\operatorname{argmax}_{\Theta} \prod_{j=1}^{m} p_\Theta(X_1 = x_{j1}, X_2 = x_{j2,\ldots}, X_n = x_{jn}) \approx \tag{12}$$

$$\operatorname{argmax} \prod_{j=1}^{m} \prod_{s=1}^{m} p_{\theta_s}(X_s = x_{js} \mid X_{N_s} = x_{jN_s})$$

which is equivalent to Equation (13):

$$\Theta^* \approx \operatorname{argmax} \sum_{j=1}^{m} \sum_{s=1}^{n} \log(P_{\Theta_s}(X_s = x_{js} \mid X_{N_s} = x_{jN_s})) \tag{13}$$

When the smooth model is selected, the approximation can be treated as the optimization in Equation (14) (for generality, the continuous form is used):

$$\operatorname{argmax} \sum_{j=1}^{m} \sum_{s=1}^{n} \left\{ \left[ -\sum_{t \in N_s} \frac{1}{(\sigma_{st})^2} (x_{js} - x_{jt})^2 - \right. \right. \tag{14}$$

$$\left. \left. \log \left[ \int_a^b e^{-\sum_{t \in N_{st}} \frac{1}{(\sigma)^2} (x_{js} - x_{jt})^2} dx_{js} \right] \right] \right\},$$

where [a,b] is the value interval of $x_{js}$. In one implementation, if it is further assumed that the Markov Random Field is homogenous and isotropic, i.e., that $\sigma_{st}=\sigma, \forall s \in S, \forall t \in N_s$, then equivalently the estimator 216 can find the optimal σ that maximizes the function in Equation (15):

$$\sum_{j=1}^{m} \sum_{s=1}^{n} \left[ -\sum_{t \in N_s} \frac{1}{\sigma^2} (x_{js} - x_{jt})^2 \right] - \tag{15}$$

$$\sum_{j=1}^{m} \sum_{s=1}^{n} \left\{ \frac{\sqrt{\pi}}{2} \exp\left( \frac{-4\zeta_{js} + \psi_{js}^2}{4\sigma^2} \right) \operatorname{erf}\left( \frac{2x_{js} - \psi_{js}}{2\sigma} \right) \sigma \Big|_{x_{js}=a}^{x_{js}=b} \right\},$$

where $\psi_{js} = 2\sum_{t \in N_s} x_{jt}$, $\zeta_{js} = \sum_{t \in N_s} (x_{jt})^2$, $\operatorname{erf}(x) = \frac{2}{\sqrt{\pi}} \int_0^x \exp(t^2) dt$.

Then the exemplary feature extraction engine 106 finds the optimal σ.

Exemplary Functionality of the Feature Extraction Engine

Figure 5:
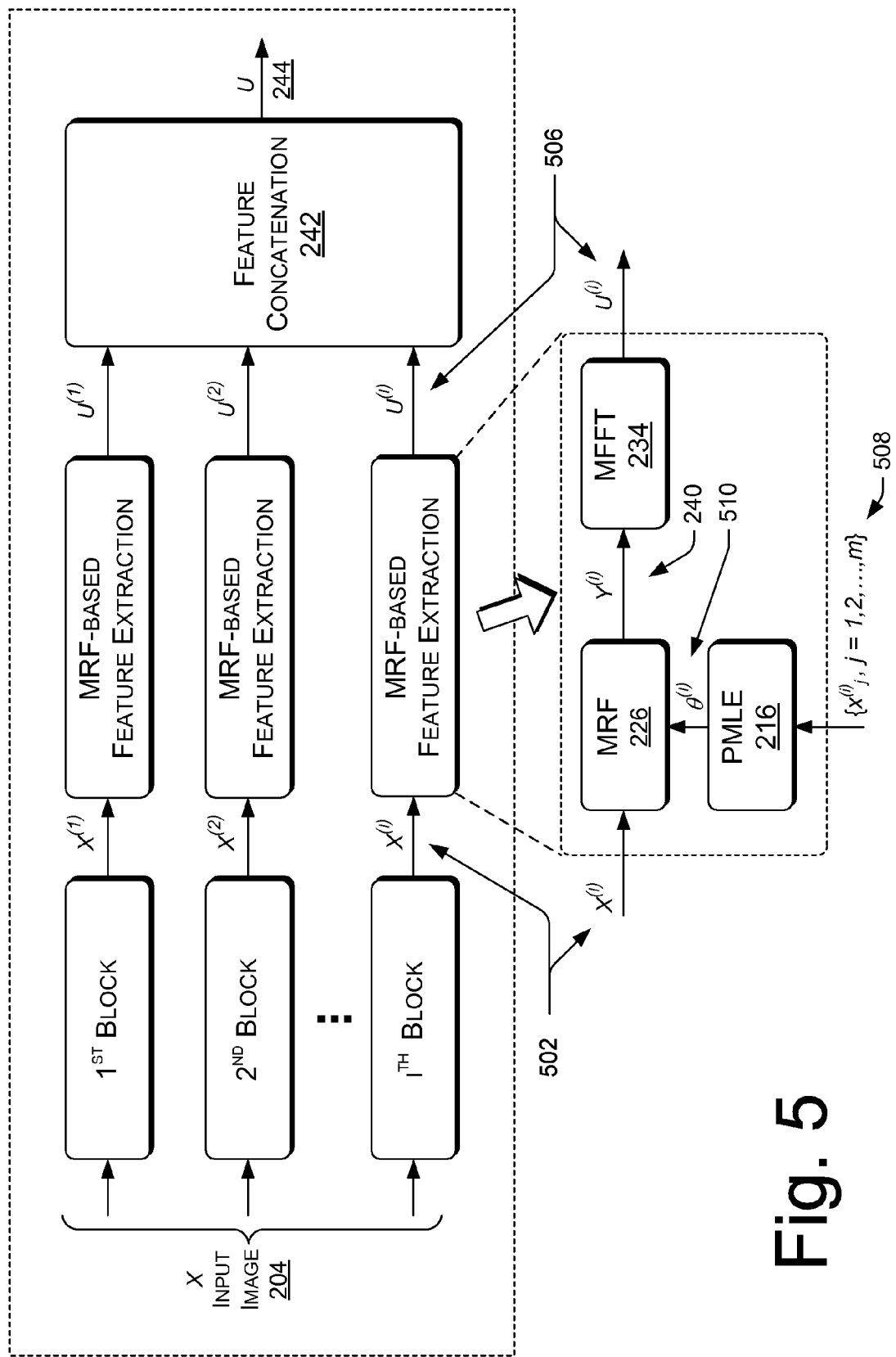
FIG. 5 is a diagram of exemplary functional flow during MRF-based feature extraction.

FIG. 5 shows an exemplary general flow of MRF-based feature extraction. An image 204 to be processed is divided into blocks. Each block undergoes MRF-based feature extraction and then feature concatenation combines the features from all the blocks. Attribute $x^{(i)}$ 502 is the selected attribute of the image at the i-th block. The term $y^{(i)}$ 240 is the local fitness sequence in the i-th block. The term $u^{(i)}$ 506 is the Modified Fast Fourier Transform (MFFT) of the local fitness sequence of the i-th block. The term $x^{(i)}_j$ 508 is the attribute in the i-th block of the j-th training image 202. The term $\theta^{(1)}$ 510 represents the parameters for Markov Random Field (MRF) modeling for the i-th block.

In one implementation, the exemplary feature extraction engine 106 performs in three stages. In a first stage, the block manager 206 divides an image 204 into C blocks 112 of size N×M and overlapping of L×K. For each block 112, the micro-structure modeler 222 independently applies the MRF attribute modeler 226 to model the attributes $x^{(i)}(i=1, 2, \ldots, C)$. In one implementation, for simplicity, the modeler 222 applies a homogenous model in each block 112, i.e., the model parameters 218 are the same within the same block.

During training, the learning engine 208 learns the model parameters $\theta^{(i)}(i=1, 2, \ldots, C)$ 218 for each block 112 from the set of pre-aligned training images $x_j^{(i)}, j=1, 2, \ldots, C$ 202, via Equation (16):

$$\theta^{(i)*} \approx \operatorname{argmax} \sum_{j=1}^{m} \sum_{s=1}^{n} \log(p_{\theta(i)}(X_s = x_{js}^{(i)} \mid X_{N_s} = x_{jN_s}^{(i)})), \tag{16}$$

where l=N×M, i=1, 2, . . . , C . Once the parameters 218 are learned, the micro-structure modeler 222 derive a series of micro-patterns 212 for each block that best fits with the observations from the training samples 202.

In extracting features from an image 204, the local fitness engine 232 computes the local fitness sequence 240 of the image 204 for each block 112 $y^{(i)}(i=1, 2, \ldots, C)$ using Equation (17):

$$y^{(i)} = \{y_{\theta(i)_s}, s = 1, 2, \ldots, l\}, \tag{17}$$

$$\text{where } y_{\theta(i)_s} = h_{\theta(i)}(x_s^{(i)}, x_{N_s}^{(i)}) = e^{-\gamma} \Big|_{\gamma = E_{\theta(i)}(x_s^{(i)}, x_{N_s}^{(i)})}, i = 1, 2, \ldots, C$$

In a second stage, the MFFT extractor 234 derives an MFFT feature of the local fitness sequence 240 in each block 112 to reduce both dimensionality and noise. The low-frequency components of the local fitness sequence 240 are maintained, while the high-frequency components are averaged. If $y^{(i)}$ denotes the local fitness sequence 240 of the i-th block 112, and $z^{(i)} = FFT(y^{(i)})$, where $z^{(i)} = \{z_s^{(i)}, s=1, 2, \ldots, l\}$, then $u^{(i)} = \{u_s^{(i)}, s=1, 2, \ldots, k+1\}$ where, as in Equation (18):

$$u_s^{(l)} = \begin{cases} z_s^{(l)}, s = 1, 2, \ldots, k \\ \dfrac{1}{l-k} \sum_{i=k+1}^{l} z_i^{(l)}, s = k+1 \end{cases} \quad (18)$$

and k is the truncation length.

In a third stage, the feature concatenator 242 concatenates $u^{(i)}$ (i=1, 2, ..., C) from all blocks of the image 204 to form the MRF-based micro-structural feature, whose length is C×(k+1), as in Equation (19):

$$u = [u^{(1)}, u^{(2)}, \ldots, u^{(C)}]^T \quad (19)$$

Exemplary Methods

Figure 6:
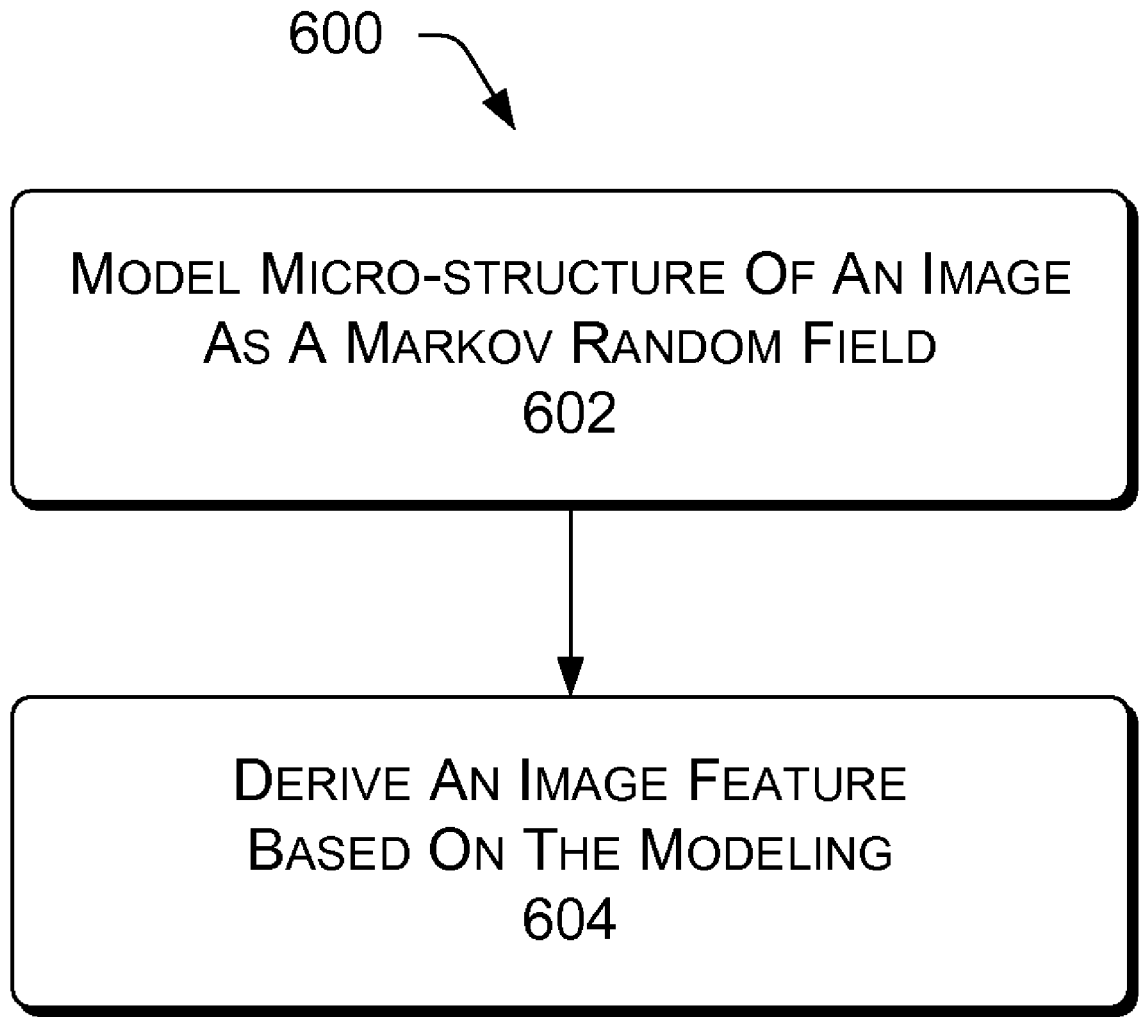
FIG. 6 is a flow diagram of an exemplary method of feature extraction.

FIG. 6 shows an exemplary method 600 of extracting features from an image. In the flow diagram, the operations are summarized in individual blocks. Depending on implementation, the exemplary method 600 may be performed by hardware, software, or combinations of hardware, software, firmware, etc., for example, by components of the exemplary feature extraction engine 106.

At block 602, the micro-structure of an image is modeled as a Markov Random Field. An attribute of the pixels in an image can be used to access image micro-structure. Markov Random Field modeling at the micro level results in extracted features that are based on image structure, as the MRF modeling captures visual spatial dependencies in the image.

At block 604, an image feature is derived based on the Markov Random Field modeling of the micro-structure. The modeled micro-structure is recast as adaptive micro-patterns via the general definition of micro-pattern. In one implementation, a site-by-site scan of probability of occurrence of the micro-patterns in the image is made within each block of the image to produce a fitness sequence. A Modified Fast Fourier Transform is applied to the fitness sequence to obtain a feature corresponding to the block.

Figure 7:
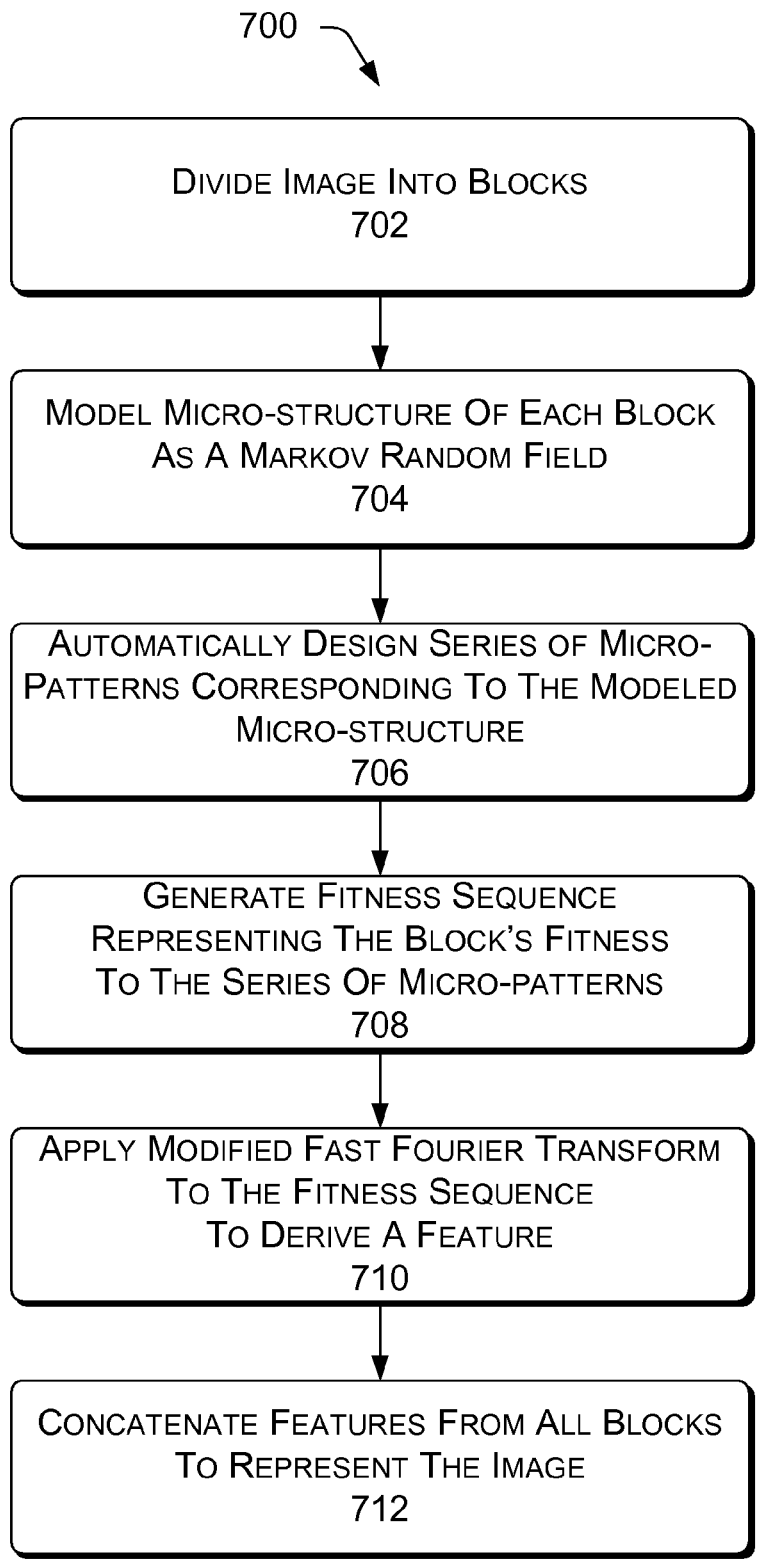
FIG. 7 is a flow diagram of an exemplary method of MRF-based feature extraction.

FIG. 7 shows an exemplary method 700 of MRF-based feature extraction. In the flow diagram, the operations are summarized in individual blocks. Depending on implementation, the exemplary method 700 may be performed by hardware, software, or combinations of hardware, software, firmware, etc., for example, by components of the exemplary feature extraction engine 106.

At block 702, an image is divided into blocks. The block dimensions may be arbitrarily selected, such as five pixels by five pixels. The selected dimensions for the block size remain the same during processing of the entire image. In one implementation, the blocks overlap, thereby providing transition smoothness and preventing a micro-structural feature from being missed due to an imaginary boundary of a hypothetical block cutting through the feature.

At block 704, the micro-structure of each block is modeled as a Markov Random Field. Spatial dependencies are well-modeled by MRF. A pixel attribute such as grayscale value or intensity may be modeled.

At block 706, a series of micro-patterns corresponding to the modeled micro-structure is automatically designed. In one implementation, a designing engine applies a general definition of micro-patterns to the MRF modeling, resulting in adaptive micro-patterns custom tailored for the image block at hand.

At block 708, a fitness sequence representing the fit of the block to the series of micro-patterns is generated. In one implementation, each block of the image is processed site by site, generating a sequence of micro-pattern fitness or a fitness index to each particular site.

At block 710, a Modified Fast Fourier Transform is applied to the fitness sequence of each image block to obtain a feature. The MFFT stabilizes the fitness sequence into a feature result by attenuating high energy micro-patterns and maintaining low energy micro-patterns. The result is a MFFT feature that has strong mathematical correspondence to the image block from which it has been derived, whether the MFFT feature has strong visual correspondence to the block or not. In other words, for each block, the MFFT feature is strongly and uniquely characteristic of the micro-structure of that block.

At block 712, the features from all of the blocks are concatenated to represent the image. Each of the MFFT features for all the blocks in the image are concatenated into a long vector that is an MRF-based micro-structural representation of the entire image.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   learning modeling parameters from a set of training images, the learning employing a pseudo maximum likelihood estimation that captures spatial dependencies in the set of training images to optimize the modeling parameters;
   dividing an image stored in a memory into overlapping blocks of the same size;
   modeling, by a processor configured with executable instructions and based on one or more selected attributes of pixels in each block, a micro-structure of each block in the image as a Markov Random Field using the modeling parameters;
   automatically designing a series of micro-patterns that corresponds to the micro-structure of each block, the series of micro-patterns capturing spatial correlations of the pixels in each block;
   calculating an occurrence probability of micro-patterns in each block to form a local fitness sequence of each block; and
   for each block, applying a Modified Fast Fourier Transform (MFFT) to the respective local fitness sequences to extract block-level features; and
   concatenating the block-level features from each block to represent the image, wherein the concatenated block-level features comprise a single feature vector representing:
   a spatial correlation of the image on a pixel level as captured by the series of micro-patterns designed for each block;
   a regional fitness of the image on a block level based on the respective local fitness sequences calculated for each block; and
   a description of the image on a global level that is a product of concatenating the block-level features.

2. The method as recited in claim 1, wherein designing the series of micro-patterns comprises designing a set of micro-patterns that follow a smooth model.

3. The method as recited in claim 1, wherein designing the series of micro-patterns comprises designing a set of micro-patterns that follow an Ising model.

4. The method as recited in claim 1, further comprising recognizing at least part of the image using the micro-patterns.

5. The method as recited in claim 1, further comprising modeling the micro-structure with parameters that are consistent over each block.

6. A system, comprising:
a processor; and
memory coupled to the processor, the memory storing:
  a block manager to divide an image into overlapping blocks;
  a Markov Random Field attribute modeler to model micro-structure of each block of the image via one or more selected attributes of pixels in each block;
  a learning engine to estimate modeling parameters for the Markov Random Field attribute modeler based on training images, the learning engine including a pseudo maximum likelihood estimator that optimizes the modeling parameters in the training images;
  a designer to automatically design a series of micro-patterns that corresponds to the respective micro-structures for each block of the image, the series of micro-patterns capturing spatial correlations of the pixels in each block;
  a fitness engine to calculate an occurrence probability of micro-patterns site by site, in each block, to form a local fitness sequence for each block in the image;
  a Modified Fast Fourier Transform feature extractor to derive a block-level feature from each respective local fitness sequence; and
  a feature concatenator to combine the block-level features to represent the image, wherein the combined block-level features comprise a single feature vector representing:
    a spatial correlation of the image on a pixel level as captured by the series of micro-patterns designed for each block;
    a regional fitness of the image on a block level based on the respective local fitness sequences calculated for each block; and
    a description of the image on a global level that is a product of combining the block-level features.

7. A method, comprising:
modeling as a Markov Random Field, by a processor, a micro-structure of each of a plurality of blocks in an image using one or more selected attributes of pixels for each block modeled;
learning to estimate parameters for the Markov Random Field based on training images, the learning employing a pseudo maximum likelihood estimation that optimizes the parameters from the training images;
dividing the image stored in memory into the plurality of blocks;
automatically designing a series of micro-patterns that corresponds to the micro-structure of each block in the image, the series of micro-patterns capturing spatial correlations of the pixels in each block;
calculating an occurrence probability of micro-patterns site by site, in each block, to form a local fitness sequence of each block in the image;
applying a Modified Fast Fourier Transform (MFFT) to each of the respective local fitness sequences to derive transformed features for each block; and
combining the transformed features for each block into a single feature vector to represent the image, wherein the single feature vector presents:
  a spatial correlation of the image on a pixel level as captured by the series of micro-patterns designed for each block;
  a regional fitness of the image on a block level based on the respective local fitness sequences calculated for each block; and
  a description of the image on a global level that is a product of combining the transformed features for each block.

8. The method as recited in claim 1, further comprising employing a fitness function to match a local image feature with a particular micro-pattern.

9. The system as recited in claim 6, further comprising a fitness function that matches a local image feature with a particular micro-pattern.

10. The method as recited in claim 7, further comprising matching a local image feature with a particular micro-pattern.

11. The method as recited in claim 1, wherein the single feature vector is a Markov Random Field based micro-structural representation of the entire image.

12. The system as recited in claim 6, wherein the single feature vector is a Markov Random Field based micro-structural representation of the entire image.

13. The method as recited in claim 7, wherein the single feature vector is a Markov Random Field based micro-structural representation of the entire image.

* * * * *